（12）United States Patent
Drummond et al.

(10) Patent No.: US 7,971,620 B2
(45) Date of Patent: Jul. 5, 2011

(54) LABEL PRODUCING MESSAGE CENTER AND PERSONAL SHOPPING DEVICE

(76) Inventors: Frederick J. Drummond, Northport, NY (US); Margaret J. Drummond, Northport, NY (US)

( * ) Notice: Subject to any disclaimer, the term of this patent is extended or adjusted under 35 U.S.C. 154(b) by 811 days.

(21) Appl. No.: 12/005,543

(22) Filed: Dec. 28, 2007

(65) Prior Publication Data

US 2009/0165962 A1    Jul. 2, 2009

(51) Int. Cl.
*B32B 38/10* (2006.01)
*A47B 77/08* (2006.01)
*G06Q 30/00* (2006.01)

(52) U.S. Cl. .......... 156/767; 156/719; 312/236; 221/23; 705/26.1; 705/26.8; 340/572.4

(58) Field of Classification Search .................. 156/344, 156/584; 312/236; 221/22, 23, 73
See application file for complete search history.

(56) References Cited

U.S. PATENT DOCUMENTS

| 4,402,424 | A | * | 9/1983 | Mattix .......................... 221/13 |
| 4,706,095 | A | * | 11/1987 | Ono et al. ...................... 347/222 |
| 4,757,329 | A | * | 7/1988 | Sato et al. ..................... 347/218 |
| 4,846,924 | A | * | 7/1989 | Morrison ...................... 156/384 |
| 6,982,640 | B2 | * | 1/2006 | Lindsay et al. ............... 340/540 |
| 7,050,991 | B2 | * | 5/2006 | Ogasawara ..................... 705/22 |
| 7,214,891 | B1 | * | 5/2007 | Hewitt et al. ..................... 177/4 |
| 7,292,146 | B1 | * | 11/2007 | Nguyen ....................... 340/572.1 |
| 2004/0085225 | A1 | * | 5/2004 | Wilson ..................... 340/870.16 |

\* cited by examiner

*Primary Examiner* — Mark A Osele
(74) *Attorney, Agent, or Firm* — Leo G. Lenna

(57) ABSTRACT

The present invention is directed to a one-touch label-dispensing device for dispensing labels marked with time information, such as the month, day and year, that can be attached or integrated into the panel of a refrigerator so that labels automatically marked and dispensed can be used to mark food items placed in the refrigerator and/or cabinets. The present invention is also directed to a one-touch label-dispensing device for dispensing labels that can be equipped with a recording device for recording audible and text messages, such as e-mails, to be played back at a later time.

21 Claims, 7 Drawing Sheets

LABEL PRODUCING MESSAGE CENTER AND PERSONAL SHOPPING DEVICE

FIELD OF THE INVENTION

The present invention relates generally to the field of food marking for freshness and personal grocery shopping device. In particular, the present invention relates to date labeling provisions so as to be able to determine freshness and a device for preparing a shopping list electronically as items are used. The date labeling device is designed to provide one-handed date label dispensing and an electronic inventory of what needs to be purchased at the store over a defined period of time.

BACKGROUND OF THE INVENTION

Time indicating labels may be used in food manufacturing industries to identify food freshness. It has long been known to manufacturers and distributors that the shelf life of perishable goods such as foodstuffs is a function of both the time and the temperature at which such goods are stored. Most perishable items purchased in a home or restaurant is stored in the refrigerator to maintain freshness. However, although most manufacturers do have a date of expiration on the food items, often this date is many times longer than the average household would like to keep the item in the refrigerator. That is, freshness of an item is not only a function of when preservatives in a product become ineffective but is also a function of the conditions in which the items are stored, and the length of time the product has been opened.

For example, an item that expires 1 year from a given date but is opened shortly after being produced would not be as fresh as the same item opened months after being produced. As stated above, manufactures often print expiration dates on products but often these dates get smeared, rubbed off or are illegible. In addition, the date of manufacturing is only half the information necessary to determine if a product in the refrigerator is fresh or not. The other piece of information that is needed is when the item was purchased, opened or placed in the refrigerator. The greater the time gap between the time the item is opened and the expiration date of the item, the less fresh the item may be. Thus, often items need to be replaced way before the manufactures expiration date of the product. For example, Items such as ketchup, mayonnaise, mustard, salad dressings and the like are not used everyday and can remain in refrigerator for months after opening but still not be out of date. Placing a label printed with the date the item was opened/or placed in the refrigerator would provide additional information to determine freshness of that item.

Although markers can be used for this purpose, they often rub off of the item, look messy and are not usually readably available when needed. Rolls of stickers can be placed near or on the refrigerator but these stickers would have to written on, peeled from their backing and placed on the item. Assuming that the labels can be found when needed, this is often a time consuming process and looks no better than using a marker. Finding a writing utensil when needed is usually also a problem. Thus, this system is no better than using a marker.

Accordingly, there is a need for a one-touch refrigerator labeling system that prints date labels, peels the labels from its backing material and dispenses the ready to be used printed label to the user in a matter of seconds. The present invention herein overcomes the shortcomings of the devices available on the market today and satisfies this market need. The present invention is further described in the sections below.

SUMMARY OF THE INVENTION

It is an object of the present invention to provide a one-touch label-dispensing device for dispensing labels marked with time information, such as the month, day and year, that can be attached or integrated into the panel of a refrigerator so that labels automatically marked and dispensed can be used to mark food items placed in the refrigerator and/or cabinets. In one embodiment of the present invention, the one-touch label-dispensing device for dispensing labels comprises a clock means for generating current date information, such as month, day and year that can be used in conjunction with a label marking means for marking the generated date information onto labels. The labels can be of a variety of shapes, sizes and colors.

It is an object of the one-touch label-dispensing device of the present invention also to provide a label-peeling device for peeling each label, in turn, from a web of backing paper so that a label produced from the labeling device is ready to stick to an item. That is, the label can be marked with the date, peeled from its backing, and dispensed with its sticky side exposed for immediate application. In order to achieve this action the label-peeling device is positioned after the label marking means so that marked labels can be peeled from their backing quickly and efficiently prior to being dispensed.

Although any configuration for the peeling device will work in the invention as long as it separates the label from its backing, in one embodiment of the invention the label peeling device comprises at least one peeling unit positioned after the label marking means past which the label web is advanced and at least one deflecting means for deflecting the backing paper web sharply in a direction that the labels will normally separate from the backing paper web as the backing paper web advances past the deflecting means. Although one deflecting means may be sufficient to assure that the label produced from the machine is produced with the sticky portion exposed, additional deflecting means can be positioned in series to assure proper peeling each time a label is produced.

It is also an object of the present invention to include at least one feed unit in order to assure that label stock is advanced to the next position. The feed unit advances the label web from a supply unit of labels past the label marking means, the peeling unit and from then from the label-dispensing device. The same or different feed unit is positioned so as to advance the backing paper web beyond the deflecting means. Once the label is dispensed, the used backing web can either be maintained within the label dispensing device so that it can be disposed of at the time when the labels are replaced, or the unit can be equipped with a cutting means that cuts the web backing after each time a label is produced, or can be equipped with a web-advancing spool that winds the used web thereon for easy disposal.

It is also an object of the invention to provide a one-touch label-dispensing device equipped with an actuation means for marking a label with date information and advancing the label past the peeling unit and out of the device in a state ready for application on an item to be marked. That is, when shopping is done and the groceries are being placed into either the refrigerator or into cabinet storage, the actuator button of the label-dispensing device of the present invention can be pressed each time a dated label is needed, and a date label will be produced for the item.

Since the device is specifically designed to produce the label with the backing removed, the actuation, marking and dispensing is already done when the label is advanced out of the device and the label can be adhered quickly and easily using one hand. This expedites the marking of items and does not belabor the task of putting away groceries. That is, no markers, labels, tape need to be located, written out and peeled from a backing in order to mark the items being put away. Instead the device of the present invention produces a label ready for application with a single touch of a finger.

In order for the device to be available when needed, the label-dispensing device of the present invention can be equipped with a mounting means for mounting on or near the refrigerator. The mounting means can be a magnetic mechanism for attaching to a metal surface, an adhesive mechanism, and/or a mechanical attachment means such as a mounting plate and screws.

Still yet another object of the present invention is to provide a label dispensing device equipped with at least one barcode storage device that reads bar codes from a hardcopy source, stores the barcodes, and transfers the barcodes to a controller. The controller includes at least one computer executable instruction that generates a list of scanned goods for printing or for transmission to a shopping establishment via the Internet®. The transmitted information can then be used for gathering and delivering the items on the generated list to a predetermined location, such as a home and/or restaurant. This feature can be used to generate a shopping list that records items as they are used so that once an order is placed or a person arrives back from the store, one does not have to make an additional trip to the store for items that were forgotten. Still further, another object of the invention is to provide a label dispensing device equipped with a wireless transmitting card that is able to transmit information obtained by the scanner to a local computer or if attached to a data transmission line, transmits data to a predetermined Internet® address upon activation of an activation button.

It is yet another object of the invention to provide new refrigerators with anyone of the above-described devices integrated directly into the refrigerator panel. The integrated unit may be equipped with a display screen that can be used for other uses such as displaying the time, date and recorded messages. The label-dispensing device of the present invention may also be equipped with a recording device for recording messages to be played back at a later time. Once a message is recorded and light can be displayed so that a person arriving home can hear the message or read it on a screen with a simple touch of a button. In even more advanced models that are attached to a data transmission line, the device can be designed to communicate with an outside computer and e-mails can be recorded and displayed without the use of a computer. An advanced version of the device of the present invention can be equipped with a text to voice converter that converts text messages to sound so that an e-mail received as text can be played back in audible language.

The present invention is described in greater detail in the figures and the detailed description section below.

BRIEF DESCRIPTION OF THE INVENTION

DETAILED DESCRIPTION OF THE INVENTION

Figure 1:
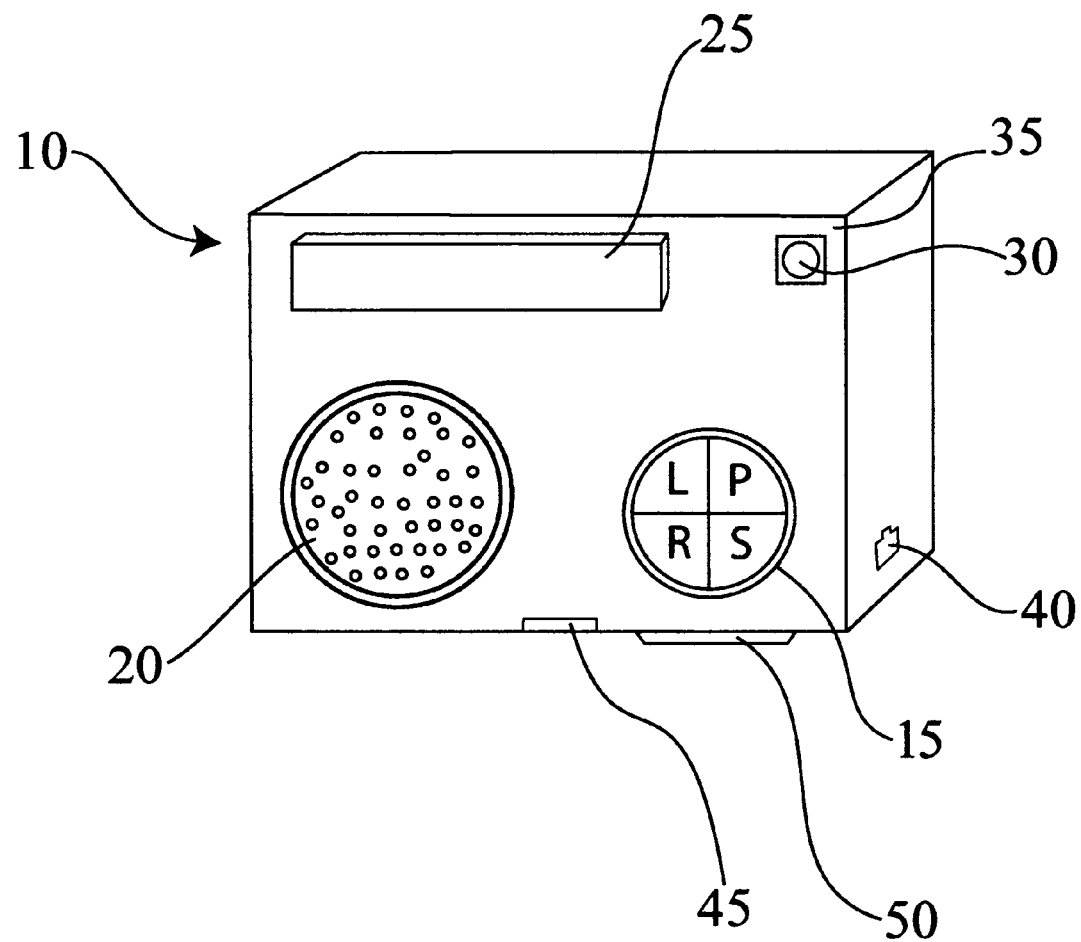
FIG. 1 shows a front view of the portable label-dispensing device of the present invention.

As stated above, food manufacturers and distributors that manufacturer and distribute perishable goods having a defined period of use usually mark the items with an expiration date. However, although most manufacturers do have a date of expiration on the food items, often this date is many times longer than the average household would like to keep the item in the refrigerator. That is, freshness of an item is not only a function of when preservatives in a product become ineffective but is also a function of the conditions in which they are stored, and the length of time the product has opened and exposed to the air.

For example, an item that expires 1 year from a given date but is opened shortly after being produced would not be as fresh as the same item opened months after being produced. Thus, an important piece of information that is necessary to determine an item's freshness is the time the item was opened. A label from the dispensing device of the present invention can be used to mark the item with this date. Using this date a person can compare the date of expiration with date marked on the item to determine the freshness of the item. For some perishable condiments, such as ketchup and mustard, a person can use the label-producing device to mark the condiment with the date it was purchased and make a decision to throw away any condiment more than a predetermined amount of time after purchase, even if not expired.

The labeling device of the present invention can also be used to produce labels that can be placed on items that are not marked with an expiration date at all, such as fresh items placed in the freezer for long-term storage. Fresh meats and fish that are purchased in quantity can be wrapped with aluminum foil, plastic wrap, vacuum sealing bags or some other wrap designed to prevent freezer burn, can be date labeled with a label produced from the labeling device of the present invention. This would allow a person to use the oldest meats/fish first and rotate stock accordingly. This is also applicable in a restaurant setting.

Unlike markers, which can be used to mark an item, the printed labels produced from the one touch label-dispensing device of the present invention produces labels that can be used to clearly mark the item to be stored. Since the printed date is either ink stamped, embossed, ink jetted, laser printed or thermal printed, the date is less likely to wear off or be washed away from the item as compared to markings from a marker. In addition, the convenient positioning of the labeling device of the present invention and its one-touch actuation makes it less likely that a person storing the item avoids marking the item with the date. That is, sometimes when a person has to take the time out to find a marker so as to mark the item being stored, the marking step is often skipped and the item is stored without a date. This act only causes problems later on when multiple items remain in the freezer undated and the user is unsure of the freshness of the unmarked items.

In one embodiment of the present invention, the label dispensing device is also equipped with at least one barcode storage device that reads barcodes from a hardcopy source. Once the barcodes are read by the barcode reader the information can be stored in the CPU or transmitted via a data line and/or a wireless transmission card to a computer in a nearby location. If the device is hardwired to a network, the barcodes can be stored on the network and later accessed when needed. If the device is connected either directly or by a wireless card to the Internet®, the barcode information can be stored in a personal account maintained by a grocery store such as Stop and Shop®, Walbaums®, or Shoprite®. The barcode can be decoded using either information provided on the merchant's site or if stored on a personal computer using a program containing a product/code decoding program.

The barcode reader of the present invention can be used to develop a shopping list including items that have been used during the week and need to be replaced. That is, when an item is finished and a replacement is needed the barcode can be passed under the barcode reader and the information stored. If one or more of the items need to be purchased, then the item can be passed multiple times under the barcode reader. Once the list is complete or after a predetermined amount of time, the user can print the list of items so that it can be used to go grocery shopping. The list can be augmented with additional items prior to printing in order to be complete. In the alternative an account can be established with a grocery shopping service and the generated list can be used as an order request and the items can be delivered by the service to a person's home. This process can make shopping as easy as scanning a barcode.

In another embodiment of the invention, the label-printing device can also include a message center. Since the refrigerator is usually located in a central part of the house, it is an ideal place to leave messages. In fact, messages that have been scribbled on a piece of scrap paper are often placed on the refrigerator door with a magnet for another family member to read. However, these messages can be illegible, not seen or lost if they fall off of the refrigerator door. In addition, most of the time a pen or paper cannot be located when needed to write the note in the first place and therefore never even gets written. The message center of the present device may include a recording/playback mechanism that can record a message so that it can be played back at a later time. The device may also include a light source that stays lighted when a message has been recorded and has not been played back. Once the message has been played the light would then turn off and the recorder is ready for the next message. This is a convenient feature for most families.

In yet another embodiment of the present invention, the device can be equipped with a screen that can display the recorded message. If the device is connected to a telephone line or has cell phone capabilities, a message can be texted to the device of the present invention and saved so that it can be read by a person already in the home or that arrives at a later time. As with the recorded voice message discussed above, the light would be lighted to indicate that a message is present. If the device is attached to a data transmission line, the device can also be used to read e-mails sent from computers or record voice messages made over the telephone. All in all, the label producing device can also be used as a central message center as well as labeling dispenser, shopping list generator and/or grocery ordering device.

Many, if not all of the above described features can be integrated directly into an information panel on the front door of a new refrigerator. In the alternative, many if not all of the equipment necessary to carry out the tasks described above can be packaged in a small portable box shaped device that can be attached to the door of an existing refrigerator to provide many if not all of the features described above. Although not absolutely required, it is preferred that the portable device use as many wireless options as possible so as not to require hard wires to be attached to the device. The integrated device, on the other hand, can be equipped with hard-wired devices to realize the desired features since these wires can be concealed within the door of the refrigerator when manufacturered.

The present invention is now described in conjunction with FIGS. 1-7 so as to fully describe the elements, features and attributes of the invention. Each of the elements of the present invention is referenced by a number that will be used to describe the various embodiments. Different views of the invention have been provided so as to fully describe the invention from every aspect. Some of the figures utilize the same numbers to reference common features between figures, whereas other figures use different reference numbers to reference structures that may be similar to previously used numbered elements but not the same.

FIG. 1 shows a front (35) view of the portable label-dispensing device of the present invention equipped with a screen (25) for displaying the date, time and/or messages that have been either e-mailed, text messaged, or recorded by the device as described above. The screen (25) can use known liquid crystal technology or can be a continuously streaming message line similar to a lighted advertisement device. The device (10) may also be equipped with an external speaker port (20) configured to allow sound to be transmitted out of the device from a speaker system positioned behind the speaker port (20) (shown in FIG. 2). Position on the front (35) of the device (10) is an external actuation button (15) that is in communication with an internal actuation button (shown in FIG. 2) that is connected to the CPU (controller) and controls various functions of the device. For example, pressing the button once can send a command to print and dispense a dated label for application to an item. The external actuation button (15) can also be pressed two times so as to record a message using the recording/playback system of the device. Once the message has been recorded a light (30) positioned on the front (35) cover of the device (25) is illuminated. A user can then press the actuation button three times to hear or read the message as directions on how to play the message may be displayed on the screen (25). Other functions for the external actuation button (15) can be envisioned and fall within the scope of the invention.

In the alternative, the actuation button (15) may be made be subdivided so that one portion is depressed to record a message, another to play back a message, a third for printing a label and a forth for shopping and/or sending the information stored to a computer/network that is either in wireless communication and or hard wired to a receiving computer. Other designs can be used to achieve the functions of the present invention.

Positioned on the front (35) cover of the device or on the side is a data port (40) that can be used to up load information, attach to a phone line, attach to a network or to directly attach to a stand alone computer. Depending on what functions the device (10) has, will depend on how the data port (40) is used.

Figure 2:
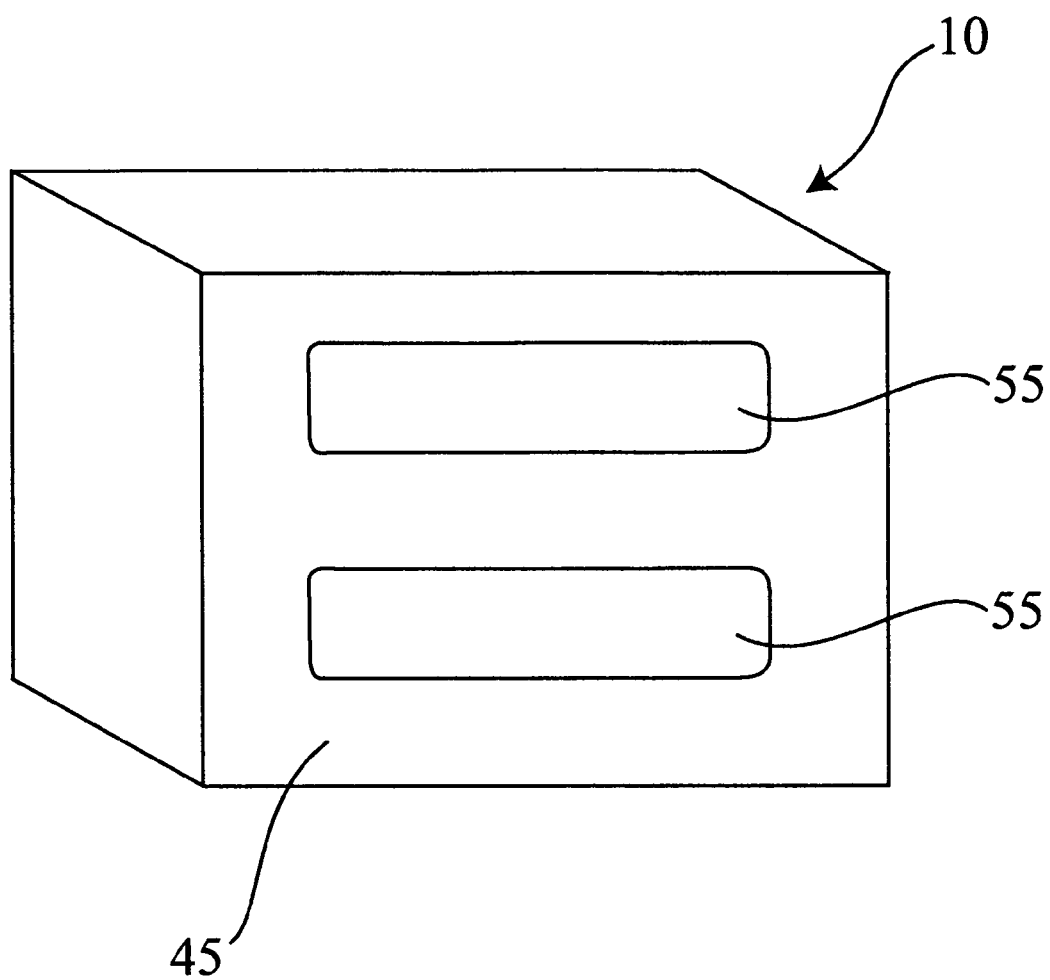
FIG. 2 shows a back view of the portable label-dispensing device of the present invention.

FIG. 2 shows a back view of the portable label-dispensing device (10) of the present invention. The back (45) of the device (10) can be equipped with a plurality of attachment means (50) for attaching to a refrigerator or cabinet as desired. The attachment means (50) can be adhesive strips, magnetic strips, or a combination of both adhesive and magnetic strips. The device can come equipped with additional strips for attachment to a refrigerator door made of different types of materials. For example, the adhesive strips must be used on stainless steel faced appliances since magnets do not work on stainless steel. As for a conventional vinyl covered steel refrigerator door, the magnetic strips may be preferred so that the device can be moved around and/or repositioned when the refrigerator is cleaned. In addition, having magnetic strips allows the user to remove the device when it needs repair, replacement, or labels need to be added to the device.

Figure 3:
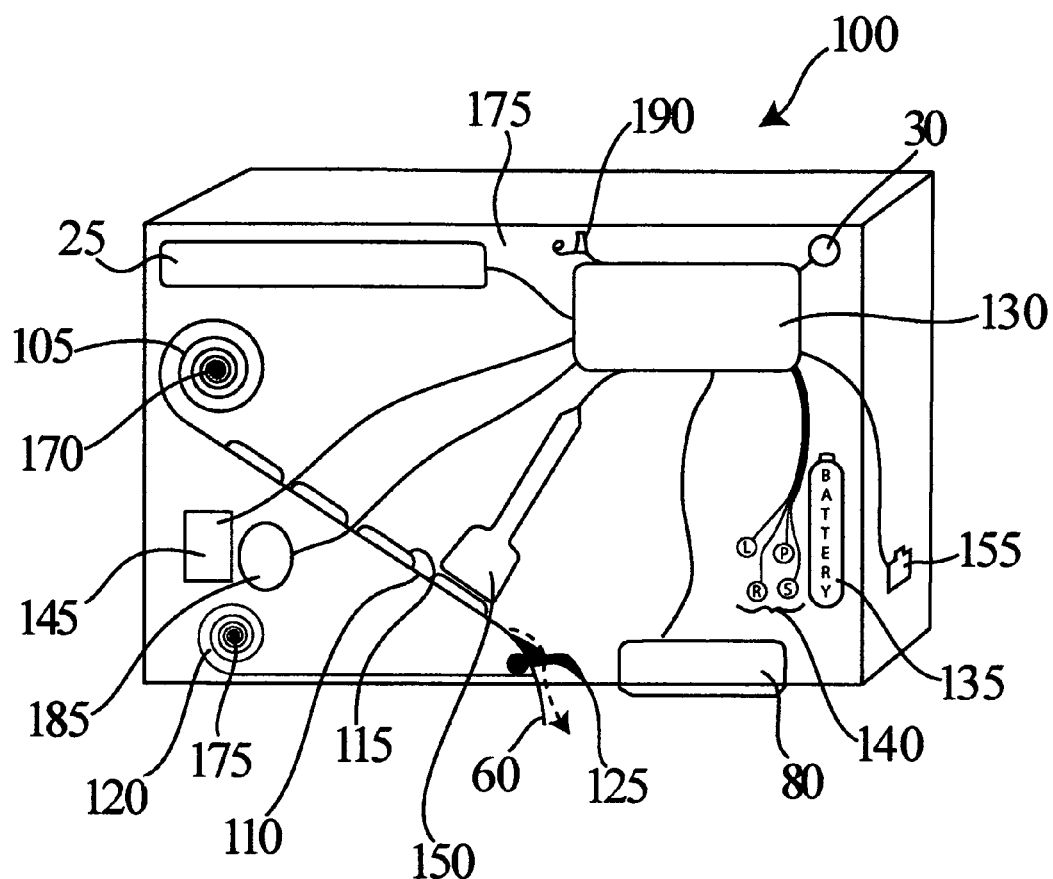
FIG. 3 shows a cross section of a front view of the portable label-dispensing device of the present invention.

FIG. 3 shows a cross section of a front view of the portable label-dispensing device of the present invention with the front panel removed. The front (180) portion of the device is equipped with a controller (130) that is connected to various functional components of the device so as to store information and/or provide operating parameters for proper functioning of the particular component. One component that is connected to the controller (30) is an internal speaker (145) that is positioned directly behind the external speaker port (20) shown in FIG. 1. This positioning allows sound produced from the internal speaker (145) to be audible form the device (110) with the front cover (35) in position. The controller can provide commands to control the function of the internal speaker (145).

Another component that is connected to the controller (130) is a print head means (150) that is positioned above an extended portion of labels (110) that are removeably attached to a web backing (115). Extra labels from a spooled label stock (105) are connected to an advancing spool (170) that advances each time a label is printed and dispensed from the device (100). The print head means (150) can be a thermal printing device, an ink jet printing device or a simple inkpad stamp device. The date information can be part of the controller or in the alternative can be a separate time keeping device that transmits information to the controller (130) which in turn transmits the information to the print head means (150) for printing. In the alternative, the separate time keeping device can transmit information directly to the print head means (150) for printing.

An internal activation button (14) is positioned directly behind the external activation button (15) shown in FIG. 1 so that when the external button (15) is depressed that internal actuator button (140) is also depressed. Once the internal actuator button (140) is depressed, a command is sent to the controller (130) and the controller (130) sends a command to the print head means (150) to print the date on the label (110) positioned under the print head means (150). The controller (130) also sends a command to advance the advancing spool (170) so as to advance the label out of the device (100) for application. In the alternative, the internal actuator button (140) can send a command directly to the print head means (150) and the advancing spool (170) without going through the controller (130) so as to activate these components. Either arrangement is contemplated as falling within the scope of the present invention.

In order to assure that the label (110) exits the device (100) removed from the web backing (115) after it is printed, the device is equipped with a peeling unit (125). The peeling unit (125) is positioned after the print head means (150). In this position the peeling device (125) will be able to strip the label (110) from the web backing (115) so that the printed label (110) can be dispensed from the device of the present invention with the adhesive part of the label (110) exposed. This allows the system to be used as a one-touch label producer. The used web backing can be wound on a discarded web backing spool (120) by a pulling spool (175) or in the alternative can be advanced into a compartment that is designed to hold the discarded web backing for disposal at a later time (not shown).

The device (100) may also be equipped with a display screen (25) that extends through the front cover as shown in FIG. 1. The screen (25) can be attached to the controller (130) and can display instructions, messages, and date information etc. A message recording device (185) designed to record audible messages can be attached to the internal speaker (145) so that recorded messages can be played back using the internal speaker device (145). The recording device (185) can be connected to the controller (130), which can send commands to the recording device (185) and internal speaker device (145) to record and playback messages. These commands can be sent to the recording device (185) to play back the recorded message when the activator button is depressed. As discussed above, the actuator button can be subdivided into record/play/label sections so as to match the pattern of the subdivided external actuator button shown in FIG. 1.

Text messages can be recorded in the memory of the controller and either displayed on the screen (25) or converted to an audible message that can be played through the internal speaker (145). The actuator button can also be used to send the required commands from the controller to achieve the appropriate action. Once a message has been recorded a light (30) is lighted so as to indicate that a message is ready to be heard or read. The device (100) can also be equipped with an internal data port (155) that can be used to attach to a phone line, network, external computer, cable or a handheld device to receive and send data. This enables the device to receive data from other computers via the Internet as well as send information over the Internet.

In one embodiment of the invention, the device (100) is equipped with a wireless/cellular transmission device (190) that can receive text and voice messages. These messages can be stored in the memory of the controller (130) or in the recording device (185). The messages can be played back as described above.

In yet another embodiment of the present invention, the device (100) can be equipped with a barcode reader (180) which can be used to read and record barcode information from items that have been used and need to be replaced or items that just need to be purchased. The barcode data can be stored in the memory of the controller, sent via the data transmission line, or sent via the wireless/cellular transmission device (190) to an external computer, website or shopping facility as described above. The barcode reader device (180) further includes a visible light indicator for indicating the scanning status of the barcode reader (180). The barcode is activated by placing a barcode under the visible light indicator of the barcode reader (180) or in an alternative can be equipped with at least one barcode activation button (not shown). In one embodiment of the invention, the barcode storage device includes an egg-shaped housing, a barcode reader for reading barcodes from a hardcopy source, memory storage means coupled to the barcode reader for storing the barcodes, and communication means for transferring the barcodes to the controller over the at least one network. The barcode reader further includes a visible light indicator for indicating the scanning status of the barcode reader and at least one barcode activation button located on the top surface of the terminal for activating the barcode reader.

Regular batteries or rechargeable batteries are used to powder the portable device or in the integrated version of the device (100), the device (100) can be directly attached to a powder supply of the home.

Figure 4:
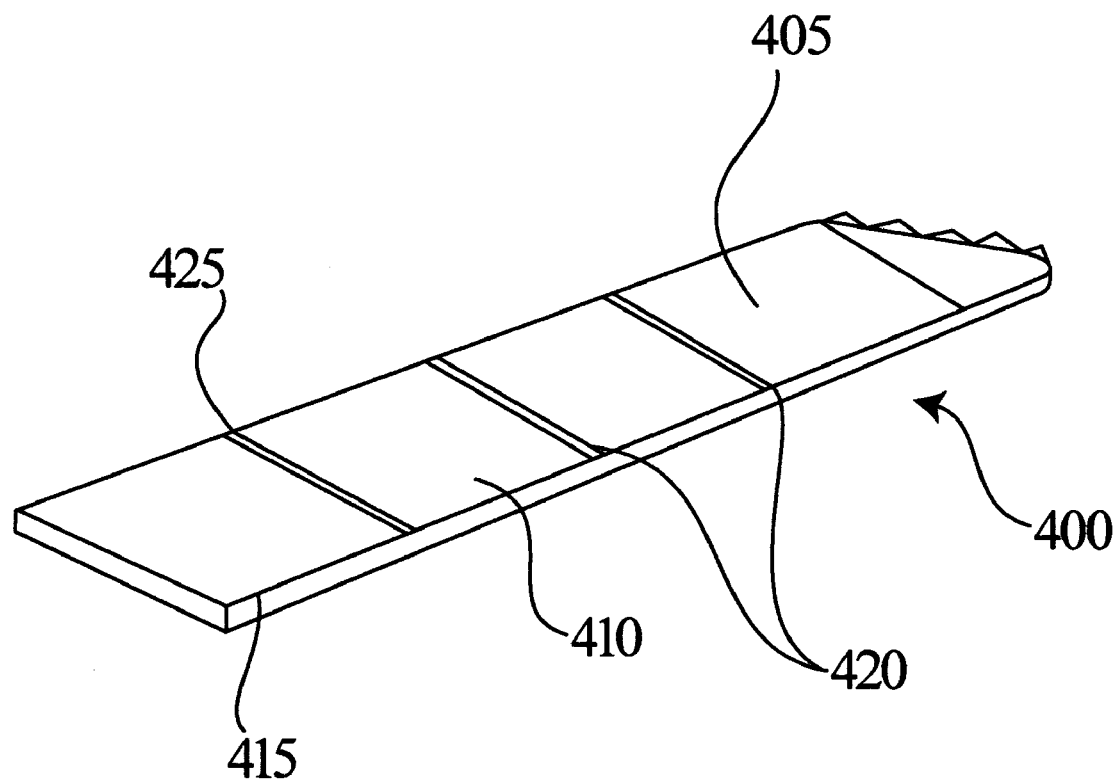
FIG. 4 shows a schematic representation of a label on a web backing.

FIG. 4 shows a stripe of labels (400) that can be used in the device (100) of the present invention. The labels (400) have a base label that can be printed upon (410) which is removeably attached to a label web backing (415). The label web backing (415) is typically coated with a silicone release coating that allows the label to be removed from the backing (415) exposing the adhesive side of the label opposite the face of the labels (400). As discussed above, the label is dispensed from the device (100) with the adhesive portion exposed so that it can be applied to a surface immediately after being dispensed without taking any additional steps. This makes the label dispensing function of the device quick and easy. Between each label are label section lines (420) that are slightly beveled creating a label edge (425). The slight beveled edge of the label (425) provides a point in which the peeling unit (125) of the device (100) (shown in FIG. 3) can use to lift the label (400) from the web backing (415) so as to expose the adhesive side of the label. This is done after the label has been printed and before it is dispensed from the device (100). The blade portion of the peeling unit (125) can be coated with a silicone coating so that the label does not prematurely stick to the blade of the unit. Advancing of the label can be controlled by the controller (130) or can be a function that is automatically done upon activation of the external actuator button (15) (shown in FIG. 1). This advancement is caused and/or aided by the advancing spool (170) which spools addition are labels/web backing and by the pulling spool (175) (both shown in FIG. 3 and discussed above), that pulls in the used web backing once the label is dispensed from the device.

Figure 5:
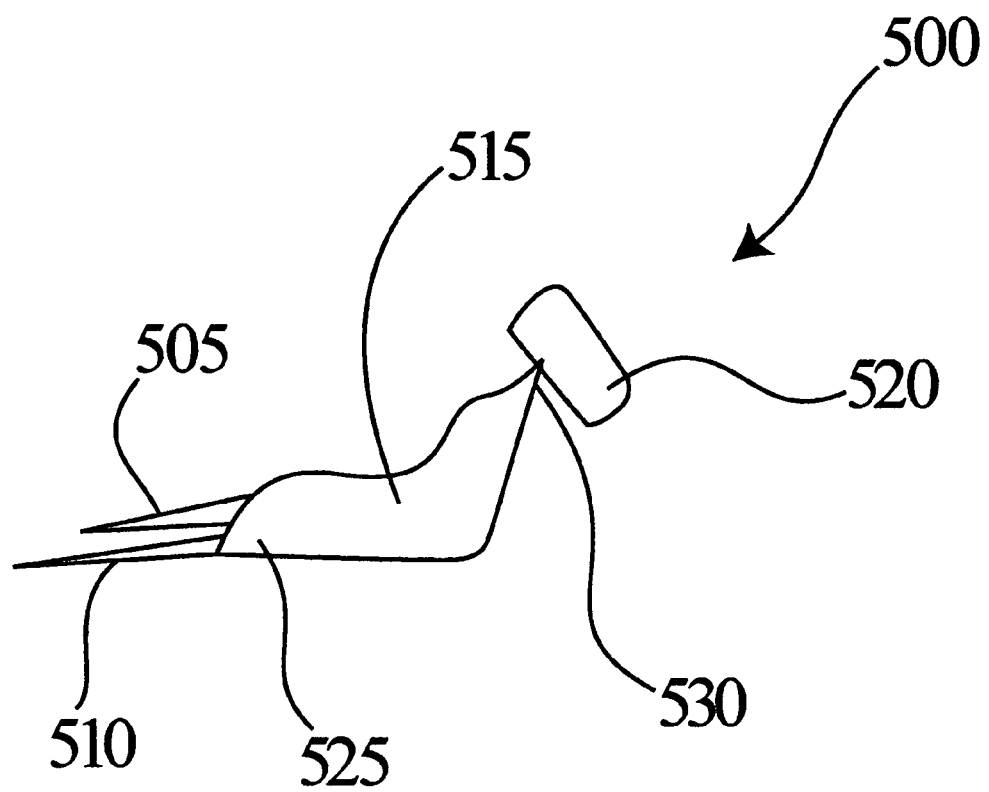
FIG. 5 shows a schematic perspective view of a label-peeling unit of the portable label-dispensing device of the present invention.

FIG. 5 shows the peeling unit (500) discussed above in FIG. 3 in greater detail. The peeling unit (500) has an attachment means (520) that attaches the device to an internal structure of the device (100) so as to rigidly hold the peeling units (500) in place as labels are passed by the peeling unit (500). The peeling unit (500) is attached to the body (515) of the peeling unit (500) at a pivot point (530). The pivot point (530) can either be flexible or rigid. The body (515) of the peeling device is continuously configured with a post (525) section that terminates with at least one blade that is designed to peel the label away from the web backing. In the embodiment shown in FIG. 5, the peeling unit (500) has a first blade (510) and a second blade (505) each having an edge designed to press against the label so as to peel the label away from the web.

Figure 6:
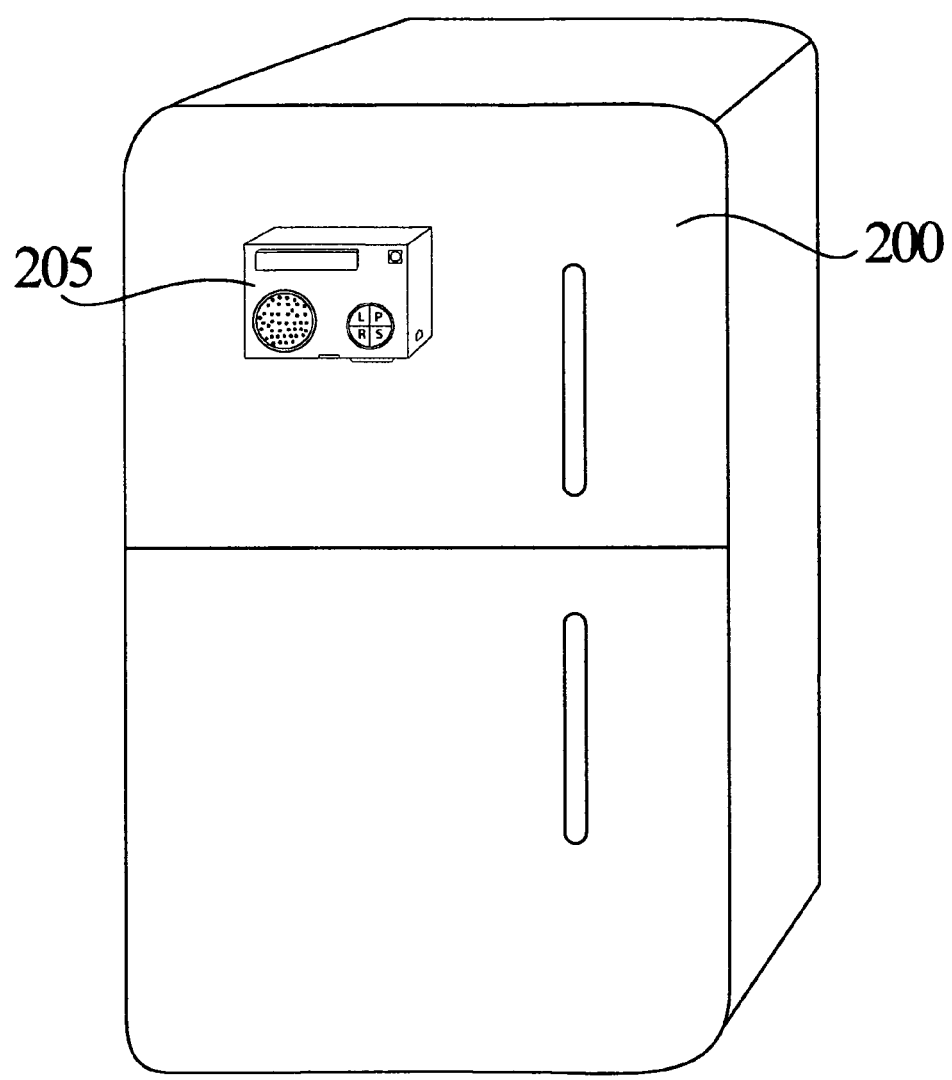
FIG. 6 shows a perspective view of a refrigerator having the portable label-dispensing device of the present invention attached.
Figure 7:
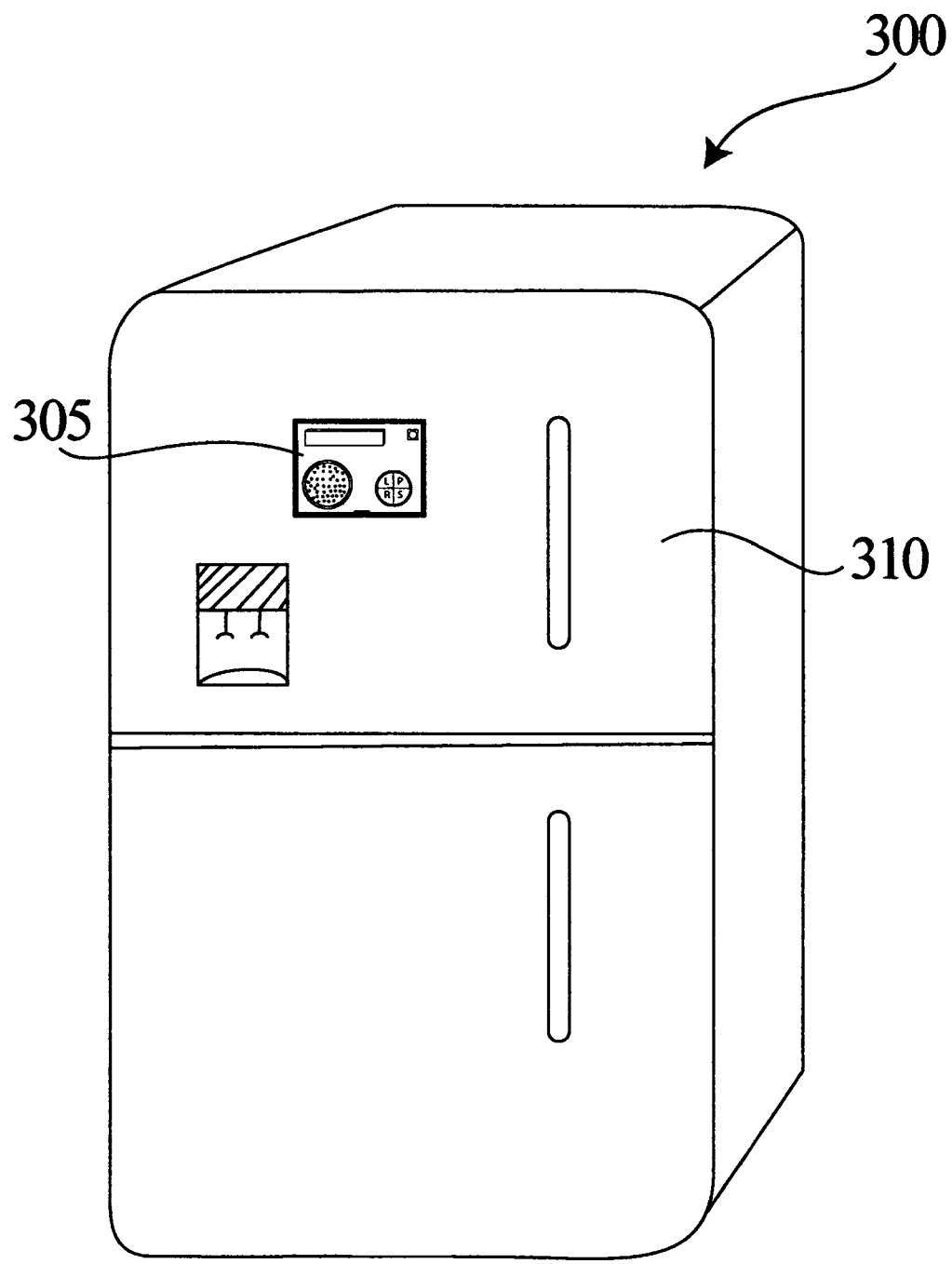
FIG. 7 shows a perspective view of a refrigerator having the portable label-dispensing device of the present invention integrated directly into the front panel of the refrigerator.

FIGS. 6 and 7 show the two different ways in which the refrigerator label-dispensing device of the present invention can be positioned so as to get the most use. As discussed above, since the kitchen is usually the gathering place of the home and is usually centrally located it is a good place to put the label dispensing/message center of the present invention. As shown in FIG. 6, the refrigerator label-dispensing device of the present invention device (205) can be attached to the main door of a refrigerator (200) at eye level so that it is available to dispense labels for marking food items and for recording and playing messages upon activation. This portable embodiment of the present invention allows a person that already has a refrigerator to retrofit the refrigerator with the device of the present invention. In the alternative, as shown in FIG. 7, the device (305) can be integrated directly into the refrigerator door panel (310) of a newly manufactured refrigerator (300). It is understood that the portable version of the device of the present invention does not necessarily have to be attached to a refrigerator but can be attached to a cabinet, counter or wall that is easily accessible to the user. In the alternative, the portable device can be carried from place to place and used to date items other than items located in the kitchen or cooking area of a restaurant. For example, the portable device can be taken to the dry storage room of a restaurant so as to date each the provisions being stored therein. Either way, the device of the present invention has many different functional features centralized in either a portable or integrated version of the device.

The one-touch label-dispensing device of the present invention can be produced in different sizes and in different colors. The device can be made of plastic, vinyl covered metal, stainless steel, plated metal, powder coated material, rubber coated metal, man-made materials or any other material that is durable enough to support the above-discussed functional components. The positioning of the screen, speaker, button, light and other components do not have to be as shown in the figures since the positioning of the components in the figures are for example purposes only. Other configurations of all of the components or less than all of the components can be constructed as long as the label producing components are included. In other words, the device can be a label producing device only or can have any or all of the other components/functions discussed above and still fall within the inventive scope of the invention.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A one-touch label-dispensing device for dispensing labels marked with time information comprising:
    a clock means for generating current date information;
    at least one label marking means for marking date information onto said labels;
    at least one label peeling device for peeling each label, in turn, from a web of backing paper, said label peeling device being positioned after said label marking means so that marked labels can be peeled from said backing, said label peeling device comprising:
    at least one peeling unit positioned after said label marking means past which said label web is advanced, and said peeling unit including deflecting means for deflecting said backing paper web sharply in a direction that said labels will normally separate from said backing paper web as said backing paper web advances past said deflecting means; at least one feed unit for advancing said label web from a supply unit of labels past said label marking means, said peeling unit and from said label dispensing device, and for advancing the backing paper web beyond said deflecting means wherein said actuation means is adapted to initiate time information, label marking and label dispensing by applying a pulling force to a protruding portion of the label.

2. The one-touch label-dispensing device according to claim 1, further comprising an actuation means for marking a label with date information and advancing said label past said peeling unit and out of said device ready for application on an item to be marked.

3. The one-touch label-dispensing device according to claim 1, wherein the actuation means includes display means for displaying information such as current date and time.

4. The one-touch label-dispensing device according to claim 1 further comprising a mounting means for locating or attaching the device to a surface.

5. The one-touch label-dispensing device according to claim 1, wherein the time data is calendar data including one or more of day, month and year.

6. The one-touch label-dispensing device according to claim 4, wherein the mounting means is a magnetic mechanism for attaching to a metal surface.

7. The one-touch label-dispensing device according to claim 1, further comprising at least one bar code storage device that reads bar codes from a hardcopy source, stores the bar codes, and transfers the bar codes to a controller, the controller including at least one computer executable instruction that generates a list of scanned goods for printing or for transmission to a shopping establishment for gathering and delivering the items on said generated list to a predetermined location.

8. The one-touch label-dispensing device according to claim 7, wherein the label-dispensing device comprises an optically transparent passage positioned so as to enable bar codes to be read.

9. The one-touch label-dispensing device according to claim 6, further comprising a plurality of buttons disposed on the front surface of said device wherein each of said buttons is associated with at least one user function or application upon activation.

10. The one-touch label-dispensing device according to claim 6, wherein a bar code storage device further comprises a bar code reader that reads bar codes, the bar code reader including a visible light source that displays the area of reading for the bar code reader upon activation of a bar code reading function.

11. The one-touch label-dispensing device according to claim 9 wherein said device comprises at least one bar code activation button located on said device, activation of said bar code activation button allows the user to view and display a visible light source.

12. The one-touch label-dispensing device according to claim 6 further comprising a touch sensitive area that receives data inputs from a stylus pen.

13. The one-touch label-dispensing device according to claim 6, further comprising a wireless data transmission means for transmitting information from said device to a CPU within range of said device.

14. The one-touch label-dispensing device according to claim 6, wherein said device is coupled to a data transmission line to transmit data to a predetermined Internet address upon activation of an activation button.

15. The one-touch label-dispensing device according to claim 14, wherein said data transmitted is transmitted to a preprogrammed Internet address of a shopping facility for remotely ordering goods to be gathered by store personnel at the shopping establishment.

16. The one-touch label-dispensing device according to claim 1, further comprising a recording device for recording messages to be played back at a later time.

17. The one-touch label-dispensing device according to claim 15, further comprising a light display that is lighted to indicate when a message has been recorded and not played and turns off once the message has been heard/read.

18. The one-touch label-dispensing device according to claim 14, further comprising an e-mail recording means that communicates with an outside computer to record and display e-mails.

19. The one-touch label-dispensing device according to claim 18, further comprising a text to voice converter for converting written text to an audible message.

20. A refrigerator having the label-dispensing device according to claim 1 integrated directly into a front panel of the refrigerator.

21. A refrigerator having the label-dispensing device according to claim 19 integrated directly into a front panel of the refrigerator.

\* \* \* \* \*